Sept. 19, 1944.  G. L. WAUGH  2,358,751
BICYCLE STOP-LIGHT SWITCH
Filed May 1, 1942
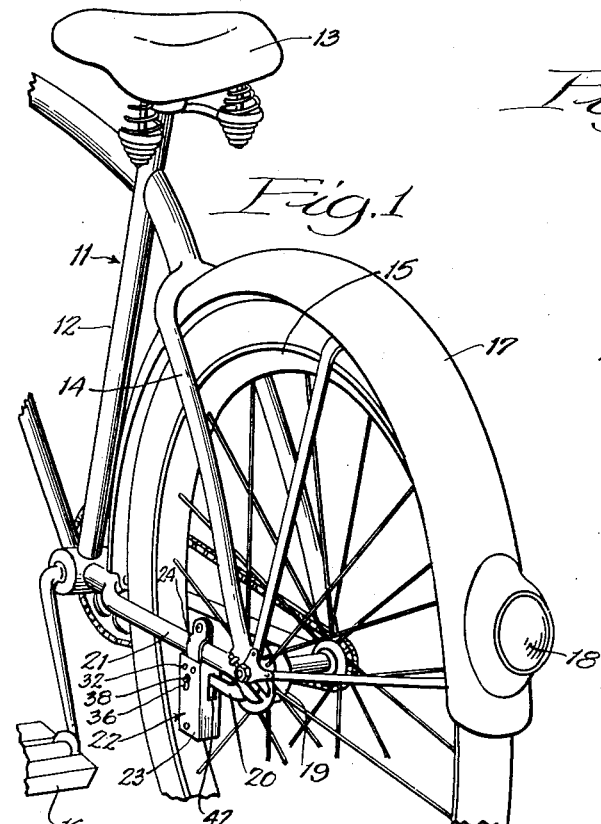
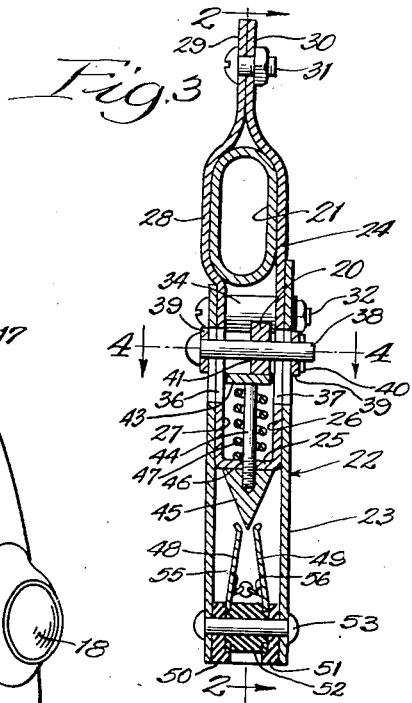
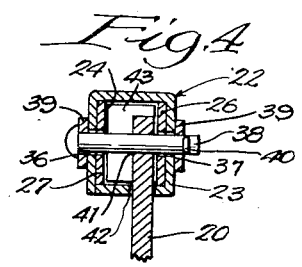
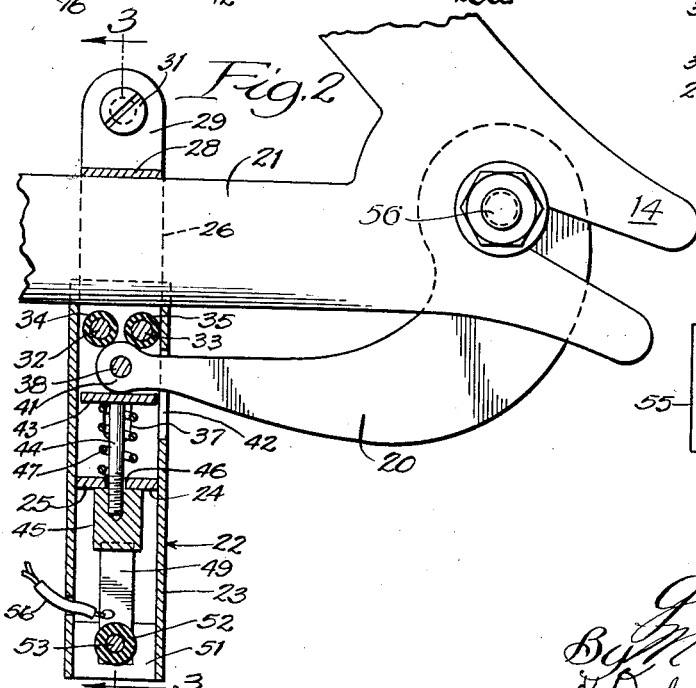
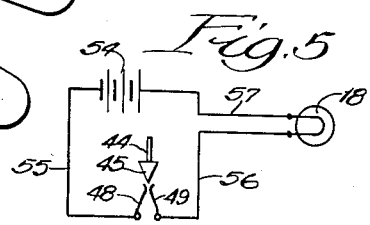
Inventor:
Glen L. Waugh,
By McCaleb, Wendt
and Dickinson, Attorneys.

Patented Sept. 19, 1944

2,358,751

UNITED STATES PATENT OFFICE 2,358,751

BICYCLE STOP-LIGHT SWITCH

Glen L. Waugh, Chicago, Ill., assignor to Arnold, Schwinn & Co., Chicago, Ill., a corporation of Illinois Application May 1, 1942, Serial No. 441,303

17 Claims. (Cl. 200—52)

The present invention relates to a switch, and is particularly concerned with a switch for the operation of stop-light or signaling means for bicycles having coaster brakes.

Numerous arrangements have been made in an attempt to provide a suitable stop-light switch for use with bicycles, and while some of the switches so produced are capable of functioning to operate a stop-light, all of said devices with which applicant is familiar require, either that the coaster brake be so modified that it will either increase the cost of the coaster brake or permit the access of dust into the interior of the brake, or that the switch device is dependent upon a frictional drag to operate the switch which is objectionable in that it consumes energy during the normal operation of the bicycle.

An object of the present invention is to operate a signal switch by a bicycle coaster brake.

Another object of the invention is to provide a stop-light switch which can be sold, and applied as an accessory to any standard bicycle equipped with a conventional coaster brake.

Another object is to operate a bicycle switch by means of lost motion between a coaster brake member and a bicycle frame during a braking operation.

Another object is to associate a signal switch with a bicycle coaster brake to be actuated by a braking force during a braking operation.

Another object is to mount a switch actuating mechanism in operative association with a bicycle coaster brake arm to be actuated by a braking force applied to such arm.

Other objects and advantages of the invention will be apparent from the following description and the accompanying drawing, in which similar characters of reference indicate similar parts throughout the several views.

Referring to the drawing of which there is one sheet,

Fig. 1 is a fragmentary view, in perspective, of the rear portion of a bicycle having a stop-light and a stop-light switch embodying the present invention mounted thereon;

Fig. 2 is an enlarged fragmentary sectional view, taken on the plane of the line 2—2 of Fig. 3, and showing a longitudinal vertical sectional view of the switch, and diagrammatically, a rear fork portion, and a coaster brake arm;

Fig. 3 is a vertical transverse sectional view, taken on the plane of the line 3—3 of Fig. 2;

Fig. 4 is a sectional view, taken on the plane of the line 4—4 of Fig. 3; and

Fig. 5 is a diagrammatic circuit drawing, showing one form of electrical circuit employed.

Referring to the drawing in detail, a bicylcle is indicated generally by the reference numeral 11, and consists of a conventional frame 12, seat 13, rear fork 14, rear wheel member 15, and pedals 16. A rear fender 17 is mounted on the bicycle in a conventional manner, and carries a stop-light 18.

The rear wheel 15 is illustrated as having a coaster brake 19 built into the rear hub thereof, the coaster brake being supplied with a brake arm or stationary brake member 20 which is customarily stationary and is secured to the horizontal bicycle rear fork member 21 by a metal strap, not illustrated.

Instead of being secured to this horizontal rear fork member 21 by means of such usual simple strap arrangement, the coaster brake arm is connected to the switch mechanism made in accordance with the present invention, and the switch member is indicated generally by the numeral 22, the switch mechanism being constructed to permit a limited amount of lost motion between the brake arm and the bicycle frame to operate the switch.

The switch 22 has a housing 23 and mounting bracket or anchor member 24. The mounting bracket 24 is preferably formed from a strip of metal, such as for instance 16 gauge sheet steel, the strip of metal being formed to a U shape, in cross-section as illustrated in Fig. 3. As thus formed the bracket has a horizontal bottom web 25, parallel side portions 26 and 27, an offset portion 28 to accommodate the horizontal fork member 21 and end portions 29 and 30. The end portions 29 and 30 are bent to lie parallel to each other, and are punched to receive a mounting bolt 31, which forces the upper ends of the mounting bracket 24 together to grip the horizontal rear fork member 21. The particular arrangement of the illustrated embodiment is adapted to permit the switch to be made and sold as an accessory which can be readily mounted on any standard type of coaster brake equipped bicycle.

The switch housing 23 may also be made of 16 gauge sheet steel and comprises a rectangular casing, open at top and bottom, and adapted to fit over the lower end of the bracket 24 as illustrated in Figs. 1 to 4 inclusive.

A pair of bolts 32 and 33 are mounted through openings in the switch housing 23 and the mounting bracket 24, each of the bolts being provided with a fiber spacer 34 and 35 respectively, the spacers being of the same length as the distance of separation between the parallel sides 36 and 37 of the mounting bracket 24, to hold the parts against inward distortion by the action of the bolts 32 and 33.

The bracket 24 and the switch housing 23 are provided with a pair of slotted openings 36 and 37, the slots being disposed vertically and adapted to receive a hardened steel pin 38 for vertical sliding movement therein.

The pin 38 is preferably provided with a pair of brass washers 39 mounted one on each side of the housing 23, the pin being secured in position by means of a cotter key 40 mounted to penetrate the pin 38 and positioned to provide a slight clearance between the washers 39 and the front and rear faces respectively of the housing 23, so as to permit free vertical movement of the pin 38 in the slots 36 and 37. The pin 38 is passed through an opening 41 in the front end of the coaster brake arm 20, an opening 42 being provided for the admission of the arm in the rear face of the housing 23 as illustrated in Figs. 1, 2 and 4, the opening being slotted vertically to permit vertical movement of the front end of the coaster brake arm 20 in the housing.

A spring pressed plate 43 is mounted to have a free sliding fit between the sides of the bracket 24, and between the front and rear walls of the switch housing 23, and is provided with a stem 44 which is threaded at its lower end and screwed into a wedge shaped contact member 45.

By threaded adjustment of the wedge 45 on the stem 44 before assembling the housing 23 with the bracket 24, the pressure required to operate the switch can be varied as desired. Thus for a heavier operating pressure the wedge would be screwed well onto the stem, as illustrated in Fig. 2, while for a lighter operating pressure the wedge may be partially unscrewed from the stem to bring the wedge 45 closer to the contact arms 48 and 49. The stem 44 is mounted to have a free sliding fit in an opening 46 in the horizontal bottom web 25 of the mounting bracket 24.

A coil spring 47 is held in compression between the web 25 and the spring pressed plate 43 to urge the spring pressed plate and the wedge 45 upwardly to the normal or "off" position illustrated in Figs. 1 to 3 inclusive. In this position the coaster brake arm 20 is held against the fiber spacers 34 and 35 in a manner which will prevent rattling of the parts.

A pair of spring contact arms 48 and 49, are mounted in insulating blocks 50 and 51 in the lower end of the housing, and are held in separation by means of an insulating spacer 52. A rivet 53 is mounted through openings in the side walls of the housing, to pass through openings in the fiber blocks 50 and 51, the spring contact arms 48 and 49, and the spacer 52, to hold the spring contact arms firmly in position. The spacer 52, as illustrated, insulates the contact arms from the rivet 53.

In the illustrated form of construction, the housing 23 and the parts secured thereto, are relatively fixed with respect to the bicycle frame, while the contact wedge 45 and its parts are relatively movable to provide a limited amount of lost motion between the frame and the coaster brake to operate the switch.

In the normal or "off" position of the switch, as illustrated in Figs. 1 to 3 inclusive, the lower edge of the wedge shaped contact member 45 is raised by the spring 47 to be out of contact with the spring contact arms 48 and 49.

In the circuit illustrated in Fig. 5, a full two wire circuit is employed. A battery 54 is indicated as the current source, one terminal of the battery being connected by means of a conductor 55 to one of the switch arms 48. From the other switch arm 49, a conductor 56 is connected to one side of the stop-light 18. From the other side of the stop-light, a conductor 57 is connected to the other terminal of the battery 54. If desired, one side of the battery and one side of the switch may be grounded in a well known manner, not illustrated, to permit the use of a single wire, or grounded, circuit. The conductors 55 and 56 are preferably connected to the spring contact arms 48 and 49 by soldering as indicated in Figs. 2 and 3.

During a normal pedaling operation of the bicycle, or while coasting, the coaster brake arm 20 is not subjected to any force from the action of the coaster brake, and in such cases, the spring pressed plate 43 holds the coaster brake arm 20 and the contact wedge 45 in the raised position illustrated in Figs. 1 to 3 inclusive, thereby maintaining the stop-light 18 unenergized.

Upon exerting a braking pressure by back pedaling in the customary manner, the coaster brake arm 20 and its associated parts within the coaster brake will be frictionally engaged in a conventional manner, so that the arm 20 will tend to rotate in the direction of rotation of the wheel 15 which, of course, will be in a counter-clockwise direction from the position illustrated in Figs. 1 and 2.

Ordinarily the brake arm 20 is held stationary by the bracket, by means of which it is usually attached to the rear fork, but the present device permits a limited amount of movement or lost motion of the arm 20 in the slot 22, before the contact 25 is suitably engaged between the contacts 48 and 49. Thus there is a lost motion mechanism included in the switch.

This action, overcoming the pressure of the coil spring 47, forces the spring pressed plate 43 downwardly, and moves the contact wedge 45 downwardly into wiping contact with the contact arms 48 and 49. The contact wedge being of conductive metal, such as brass or bronze, as illustrated in Fig. 5, current will flow from the battery 54 through the conductor 55, the contact arm 48, the conductive wedge 45, the contact arm 49, the conductor 56, the stop-light 18, and the conductor 57, to thereby illuminate the stoplight.

The device can be easily mounted on any bicycle having a conventional type of coaster brake by merely separating the upper portions of the bracket 24 above the upper edge of the switch housing 23, and sliding the arms upwardly to receive the horizontal fork member 21 therebetween. The sides of the bracket 24 can then be brought together and secured by the bolt 33.

In order to insure proper adjustment of the coaster brake arm, a lock nut, not shown, is threaded onto the axle 56 of the rear wheel to lie between the fork 14 and the brake arm 20, before mounting the switch.

When mounting the switch on a bicycle, care should be exercised to locate the switch so that the pin 38 will be free for vertical movement in the slots 36 and 37. To reduce the possibility of binding at these points, I prefer to make the slots 36 and 37 wide enough to insure free clearance of the pin 38 during an operative movement thereof.

To this end, I may shape the slots 36 and 37 arcuately so as to define an arc which will be concentric with a coaster brake arm 20 of predetermined length, as indicated in Fig. 2, although I have found that simply increasing the width of the slot as illustrated in Fig. 1 insures satisfactory operation for all practical purposes.

The specific arrangement of wiring illustrated provides one satisfactory arrangement, although any other suitable method of wiring a switch to a stop-light may be employed if desired, without departing from the invention.

The device is simple, rugged and practical, is easily manufactured, can be readily mounted upon any bicycle having a conventional coaster brake, and has no functional interference with the operation of the bicycle.

The action of the switch is not affected by exposure to the elements, since any water entering the device will drain out, and the parts are constructed with sufficient clearance so that the presence of dust does not affect the operation. To this end also, the contact surfaces of the switch are preferably substantially vertical, and the wiping action of the switch has a tendency to clean the contact surfaces upon each application of the brake to operate the switch.

It will be apparent to those versed in the art that various modifications of the housing and switch can be provided, which are within the capabilities of an ordinary mechanic, where, for instance, it may be desired to have a more streamlined appearance, or where more complete protection from the elements is desired.

While I have illustrated a preferred embodiment of my invention, many modifications may be made without departing from the spirit of the invention, and I do not wish to be limited to the precise details of construction set forth, but I desire to avail myself of all changes within the scope of the appended claims.

Having thus described my invention, what I claim as new and desire to secure by Letters Patent of the United States, is:

1. A bicycle stop-light switch, comprising a switch member adapted to be connected to a bicycle frame, a second switch member, movably connected to the first switch member and adapted to be operatively connected to a coaster brake arm, to have an operative position and an inoperative position, and means normally holding the switch members in an inoperative position, the pressure of the holding means being less than a predetermined braking force on the coaster brake arm, the exertion of such predetermined force on the coaster brake arm moving the switch members relatively to an operative position.

2. A bicycle stop-light switch, comprising a switch frame adapted to be connected to a bicycle frame, a plunger mounted in the switch frame and free for limited slidable movement therein, an end of the plunger being adapted to engage a pivoted coaster brake arm, a connector adapted to connect a coaster brake arm to the switch frame beyond an end of the plunger, the connector being free for limited movement in the direction of movement of the plunger, spring means acting between the switch frame and the plunger normally to resist a braking force on the coaster brake arm, and normally open contact means mounted in the path of movement of the plunger, said contact means being positioned to be closed by a movement of the plunger by the coaster brake arm against the pressure of said spring.

3. A bicycle stop-light switch operatively mounted between a bicycle frame and a relatively movable coaster brake member located exteriorly of the hub of the wheel within which the brake is housed but adjacent to the frame, the switch having a normal open position, and having an operated closed position, the switch being operated by a movement of the coaster brake member by a predetermined braking force acting to effect movement of the coaster brake member relative to the bicycle frame.

4. A bicycle stop-light switch for mounting operatively between a bicycle frame and a movable coaster brake element located exteriorly of the brake housing, the switch comprising a fixed member adapted to be connected to the bicycle frame, a relatively movable member adapted to engage the bicycle brake element to be moved by movement imparting braking force applied to said brake element, and normally open contact means operatively associated with the fixed member and the movable member to be closed by such movement of the movable member.

5. A bicycle stop-light switch for mounting operatively between a bicycle frame and a coaster brake arm, the switch comprising a substantially tubular frame open at top and bottom, a clamp carried by the frame to clamp a bicycle frame member, a connector for a coaster brake arm mounted in longitudinally disposed guide-ways in the tubular frame, a movable switch member mounted in the path of movement of the brake arm connector, spring means normally pressing the movable switch member and the brake arm connector in a direction opposed to a braking force, a switch contact member mounted adjacent the movable switch member to have a normal open condition with the movable switch member in spring-held position, and to have a closed condition with the movable switch member moved counter to the pressure of said spring.

6. A bicycle stop-light switch for mounting operatively between a bicycle frame and a coaster brake arm, the switch comprising a substantially tubular frame open at top and bottom, a clamp carried by the frame to clamp a bicycle frame member, a connector for a coaster brake arm mounted in longitudinally disposed guide-ways in the tubular frame, a movable switch member mounted in the path of movement of the brake arm connector, spring means normally pressing the movable switch member and the brake arm connector in a direction opposed to a braking force, a switch contact member mounted adjacent the movable switch member to have a normal open condition with the movable switch member in a spring-held position, and to have a closed condition with the movable switch member moved counter to the pressure of said spring, the switch contact member and the movable switch member having mutually contacting surfaces in a closed condition, the contacting surfaces being relatively upright and positioned to relatively wipe each other on a movement of the movable switch member from an open to a closed condition.

7. The combination with a bicycle frame and a brake arm having a normal freely pivoted condition and having a braking wheel engaging condition; of a bicycle stop-light switch carried by the bicycle frame and having a movable switch operating portion operatively connected to the brake arm, to have an operative, and an inoperative position, and means normally holding the switch operating portion in an inoperative position against a movement of the brake arm under a wheel engaging condition, the holding means exerting a lesser force than a predetermined braking force on said brake arm.

8. A bicycle stop-light switch, comprising a switch member connected to a bicycle frame, a connection for a coaster brake arm carried by the switch member, the connection being mounted in a guide-way for limited movement therein, a contact member mounted in the path of movement of said connection to have an operative and an inoperative position, and spring means carried by the switch member, and engaging the contact member, to urge the contact member to an inoperative position against the direction of a braking force, the force of the spring means being less than a predetermined braking force on a coaster brake arm, the exertion of such predetermined force on the coaster brake arm moving the contact member to an operative position.

9. A bicycle stop-light switch, comprising a switch member connected to a bicycle frame, a connection for a coaster brake arm carried by the switch member, the connection being mounted in a guide-way for limited movement therein, an adjustable contact member mounted in the path of movement of said connection to have an operative and an inoperative position, said contact member being adjustable in the direction of movement of the connection, and spring means carried by the switch member, and engaging the contact member, to urge the contact member to an inoperative position against the direction of a braking force, the force of the spring means being less than a predetermined braking force on the coaster brake arm moving the contact member to an operative position.

10. A bicycle stop-light switch for mounting between a bicycle frame and a coaster brake arm, the switch comprising a U shaped frame member having an opening in the web end thereof, a housing mounted to enclose the web end of the U shaped member, the housing having a vertically slotted opening to receive a coaster brake arm, a movable switch member having a reduced central portion mounted in the opening in the U shaped member, and free for vertical sliding movement therein, one end of the movable switch member adapted to engage a coaster brake arm, a spring mounted between the U shaped member and the movable switch member to support the movable switch member in an inoperative position, and a switch contact member carried by the housing beyond the U shaped member, the contact member being positioned to engage the movable switch member, on a predetermined movement of the movable switch member against the force of said spring.

11. The combination with a bicycle coaster brake having a rotating wheel member, a stationary braking member, and an anchor for holding the stationary member against rotation, and a stop-light switch including a lost motion mechanism operatively interposed between the anchor and the wheel member for operating the switch.

12. The combination with a bicycle coaster brake having a rotating braking member, a stationary braking member, and an anchor for holding the stationary member against rotation, and a stop-light switch including a lost motion mechanism operatively interposed between the stationary braking member and the anchor for operating the switch.

13. The combination with a bicycle frame having a coaster brake with a rotating wheel member, a stationary braking member, and an anchor for holding the stationary member against rotation, and a stop-light switch including a lost motion mechanism operatively interposed between the bicycle frame and the wheel member for operating the switch.

14. The combination with a bicycle frame, a coaster brake and a brake actuated device, of a lost motion mechanism formed as a structure separate from the coaster brake operatively interposed between the coaster brake and the frame for operating the brake actuated device on a braking operation of the coaster brake.

15. In combination in a coaster brake operated stop light switch for bicycles, cooperating separable electrical contacts located outside of and separate from the coaster brake mechanism, one of the contacts being supported stationarily with the bicycle frame, and means for supporting the remaining contact for movement into and out of electrical engagement with said one contact, said means being operatively engaged in relatively movable relation with a movable component of the coaster brake structure which is adapted to be moved in a direction to drive said remaining contact into contact-engaging position when the brake is applied but in a direction to separate the contacts when the brake is released.

16. In combination in a bicycle stop light switch, cooperating separable contacts, a structure for supporting one of the contacts in a fixed position adjacent to the frame of the bicycle with which the switch is associated and in spaced relation beyond one end of the coaster brake of the bicycle, a support for the remaining contact comprising a device mounted in engagement with a part of the coaster brake structure, which part, upon application of the brake, is movable in a direction to move the device to carry said remaining contact into circuit closing engagement with said one contact, and means on said supporting structure cooperative with said device for limiting its contact closing movement.

17. In an electrical switch, the combination of a vehicle frame with a switch member, said switch member having a fixed contact and a movable contact, and means for actuating said movable contact, comprising a brake arm carried by a coaster brake, the said brake arm being operably connected to said movable contact, and said coaster brake being carried by a wheel structure, whereby the application of the braking force to the wheel structure causes a closure of the contacts due to the brake arm movement.

GLEN L. WAUGH.